UNITED STATES PATENT OFFICE.

JONAS W. AYLSWORTH, OF EAST ORANGE, NEW JERSEY, ASSIGNOR TO CONDENSITE COMPANY OF AMERICA, OF BLOOMFIELD, NEW JERSEY, A CORPORATION OF NEW JERSEY.

CONDENSATION PRODUCT OF PHENOLS AND FORMALDEHYDE AND PROCESS OF MAKING SAME.

1,197,171.      Specification of Letters Patent.      Patented Sept. 5, 1916.

No Drawing.      Application filed June 16, 1915. Serial No. 34,484.

*To all whom it may concern:*

Be it known that I, JONAS W. AYLSWORTH, a citizen of the United States, residing at East Orange, in the county of Essex and State of New Jersey, have invented certain new and useful Improvements in Condensation Products of Phenols and Formaldehyde and Processes of Making Same, of which the following is a specification.

My invention relates to condensation products of phenols and formaldehyde and to methods of preparing the same.

My particular object is to devise a process whereby mineral acids may be used as accelerating agents in the condensation reaction, without incurring certain disadvantages which are usually incident to the use of such acids. For this purpose I neutralize the acid after it has performed its function, with one of a number of metallic compounds, which will form with the acid a non-water soluble electrically insulating compound or a salt which may remain within the mass without harmful effect, or may be readily removed if desired.

My invention also comprises the formation of products containing the electrically insulating compounds or salts referred to.

It is well known that mineral acids act as powerful accelerating agents in the condensation reactions between phenols and formaldehyde. For many purposes, however, they are undesirable because the reaction is liable to proceed too far even at comparatively low temperatures, which fact interferes with the subsequent operations of making and using molding compositions, or varnishes and lacquers of or comprising the condensation products, and the preservation of the same in condition for use through a period of time. Acid condensing agents are also objectionable for use in making compositions in which high dielectric properties are desired, since it is practically impossible to remove acids from the initial or partial condensation product by the usual washing operations to a sufficient extent to enable the best dielectric properties of the product to be utilized.

By my invention, the desirable properties of mineral acids, well known as accelerating agents, are utilized in the manufacture of condensation products, while the objectionable features of the same are eliminated.

My improved process comprises the use of hydrochloric, sulfuric or other mineral acid, capable of producing an inert non-conducting water insoluble salt with certain metallic compounds or bases, as an accelerating agent, in an amount sufficient to produce the condensation reaction as rapidly or completely as desired. Generally from one-half of one per cent. to ten per cent. of the weight of the phenol used is sufficient. The acid is then rendered harmless by adding a sufficient quantity of a metallic or basic compound, such that a non-water soluble electric insulating compound or salt will be formed thereby with the acid. The salt formed may be removed by filtration if a clear product or a varnish or lacquer is desired, or it may remain in the mass as a filling body, which will not be objectionable from the points of view referred to above and may be a desirable constituent, by tending to cheapen the product, etc. When sulfuric acid is the accelerating agent used, such a neutralizing agent therefor should be employed as will cause the formation of a water insoluble electrically insulating sulfate, such as the sulfates of barium, strontium and lead. Barium carbonate appears to be the best adapted for the purpose, among the neutralizing agents with which I am familiar. When hydrochloric acid is used as the condensing agent, such a neutralizing substance should be used as will form a chlorid having the desired properties. I consider carbonate of lead the best adapted agent for this purpose.

A specific example of the manner in which my invention may be practised is as follows:—94 parts by weight of phenol, together with 80 parts of a 40% formaldehyde solution, or 30 parts of anhydrous trioxy-methylene together with one part of sulfuric acid and 5 parts of water, are mixed, and reaction caused to ensue. Reaction will take place slowly at ordinary temperatures, but I prefer to heat the mass slowly to a temperature of about 90° C. for approximately two hours after which the temperature is raised slowly to 115° C. for about one hour. Barium carbonate is then added in quantities sufficient to combine with all of the sulfuric acid, or in a quantity in excess of that necessary to combine with all of the acid, which will more rapidly render the acid inert. In one case a precipitate of barium sulfate is formed and in the other a mixture of barium sulfate and barium carbonate. This neutralizing operation may be performed by mixing the carbonate with the mass, while the latter is warm, in a suitable mixing machine, or a suitable solvent may be added to the product to thin the same, in which case the precipitated barium sulfate and excess, if any, of the barium carbonate, may be removed if desired by filtration, settling or centrifugal separation. If hydrochloric acid is used as the condensing agent, lead carbonate as stated is the preferred neutralizing agent in which case lead chlorid will be the precipitate. In both instances referred to, the products formed will have excellent dielectric properties well adapted for molding or for other use. The partial condensation products thus obtained may be used dissolved in a suitable solvent for the formation of lacquer varnishes, or for impregnating compounds, or when admixed with a suitable filler, for molding compositions. When the latter use is desired there is no necessity for filtering or otherwise removing the harmless salt of the acid. The composition formed may be subsequently hardened to infusibility in the well known manner.

The various homologues of phenol may be substituted for phenol either in relatively pure condition or as mixtures, and other substances containing reactive methylene groups may be used in place of formaldehyde.

In my prior copending applications Serial Nos. 780,453, filed July 22, 1913, which has matured into Patent No. 1,146,299, granted July 13, 1915, and 782,943, filed August 4, 1913, which has matured into Patent No. 1,146,300, granted July 13, 1915, I have described processes in which the product formed contains a water insoluble salt, which, as in the present case, is finely divided and distributed through the mass. My present invention, so far as the same concerns the product formed, is specifically limited to the products described and claimed herein. The processes described in my patents referred to are quite different from that described herein in that they have to do with the formation of condensation products in which alkaline substances are included in the initial or partial products and subsequently neutralized by means of certain acids.

An advantage of the carbonate referred to as neutralizing agents for the acid is that an excess of the same may be used without harmful effect, since they are insulating and water insoluble. The corresponding hydrates may be used instead of the carbonates, but should be used in exact amounts to neutralize the acid, since an excess will tend to decrease the dielectric strength of the product.

In the process described, the neutralizing agent may be added to a partial condensation product, capable of being hardened to infusibility by heat or heat and pressure, or to a mixture of a permanently fusible phenol resin and a methylene-containing hardening agent therefor.

Having now described my invention, what I claim and desire to protect by Letters Patent is as follows:—

1. In a process of forming a phenolic condensation product, which comprises causing a reaction between a phenol and a substance containing a reactive methylene group, in the presence of a mineral acid condensing agent, the step consisting in mixing with the mass, after partial reaction of the phenol and said substance, such a metallic compound as will form a non-water-soluble, electrically-insulating salt with the acid agent, substantially as set forth.

2. In a process of forming a phenolic condensation product, which comprises causing a reaction between a phenol and a substance containing a reactive methylene group, in the presence of sulfuric acid as a condensing agent, the step consisting in mixing with the mass, after partial reaction of the phenol and said substance, barium carbonate, to combine with the said acid to form a precipitate of barium sulfate, substantially as set forth.

3. In a process of forming a phenolic condensation product, which comprises causing a reaction between a phenol and a substance containing a reactive methylene group, in the presence of sulfuric acid as a condensing agent, the step consisting in mixing with the mass, after partial reaction of the phenol and said substance, barium carbonate, in quantity in excess of that necessary to combine with all of the said acid, substantially as set forth.

4. The process of forming a phenolic condensation product, which consists in causing reaction to take place between a phenol and a substance containing a reactive methylene group, in proportions suitable to form an infusible condensation product, in the presence of a mineral acid condensing agent, mixing with the mass, after partial reaction of the mass and said substance, such a metallic compound as will form a non-water-soluble electrically insulating salt with the acid agent, said metallic compound being added in proportion at least sufficient to combine with all of said acid agent, and causing such salt to be formed in the mass, substantially as set forth.

5. The process of forming a phenolic condensation product, which consists in causing reaction to take place between a phenol and a substance containing a reactive methylene group, in proportions suitable to form an infusible condensation product, in the presence of sulfuric acid as a condensing agent, mixing with the mass, after partial reaction of the mass and said substance, barium carbonate in quantity at least sufficient to combine with all of said acid, and causing barium sulfate to be precipitated, substantially as set forth.

6. As a new composition of matter, a phenolic condensation product containing barium sulfate and barium carbonate in finely divided condition, distributed therethrough, substantially as set forth.

This specification signed and witnessed this 14th day of June, 1915.

JONAS W. AYLSWORTH.

Witnesses:
DYER SMITH,
I. McINTOSH.